United States Patent
Kamiya

(10) Patent No.: US 7,852,030 B2
(45) Date of Patent: Dec. 14, 2010

(54) CONTROLLER FOR CONTROLLING ROBOT BODY WITH POWER-OFF BRAKE

(75) Inventor: Koji Kamiya, Anjo (JP)

(73) Assignee: Denso Wave Incorporated, Tokyo (JP)

( * ) Notice: Subject to any disclaimer, the term of this patent is extended or adjusted under 35 U.S.C. 154(b) by 315 days.

(21) Appl. No.: 12/155,815

(22) Filed: Jun. 10, 2008

(65) Prior Publication Data

US 2008/0309273 A1  Dec. 18, 2008

(30) Foreign Application Priority Data

Jun. 12, 2007  (JP) .............................. 2007-155176

(51) Int. Cl.
  *G05B 19/19* (2006.01)
  *G05B 19/406* (2006.01)
  *G05B 9/00* (2006.01)
(52) U.S. Cl. ....................... 318/563; 318/273; 318/372; 901/2; 901/23; 901/38
(58) Field of Classification Search ................. 318/273, 318/560, 563, 567, 569, 628, 371, 372; 901/1, 901/2, 9, 27, 38, 48–50, 20, 23
See application file for complete search history.

(56) References Cited

U.S. PATENT DOCUMENTS 4,931,711 A * 6/1990 Naruo ................... 318/568.13
5,394,069 A * 2/1995 Danielson et al. ........... 318/371
6,091,219 A * 7/2000 Maruo et al. ................ 318/562
2008/0116828 A1* 5/2008 Horikoshi et al. ........... 318/273

FOREIGN PATENT DOCUMENTS

JP  A-04-315593  11/1992

* cited by examiner

*Primary Examiner*—Bentsu Ro
*Assistant Examiner*—Eduardo Colon-Santana
(74) *Attorney, Agent, or Firm*—Oliff & Berridge, PLC

(57) ABSTRACT

In a controller, a first switch unit establishes electrical connection between a power-off brake and a power source when a servomotor is energized. The electrical connection causes the power-off brake to be released. A second switch unit is provided between the power-off brake and the power source. The second switch unit establishes electrical connection between the power-off brake and the power source upon being manually operated during the servomotor being deenergized. A calculating unit calculates a driving speed of the joint by the servomotor. A determining unit determines whether the calculated driving speed of the joint is greater than a predetermined threshold speed. An interrupting unit interrupts a supply of electrical power from the power source to the power-off brake through the electrical connection established by the second switch unit when it is determined that the calculated driving speed of the joint is greater than the predetermined threshold speed.

10 Claims, 7 Drawing Sheets

CONTROLLER FOR CONTROLLING ROBOT BODY WITH POWER-OFF BRAKE

CROSS REFERENCE TO RELATED APPLICATIONS

This application is based on Japanese Patent Application 2007-155176 filed on Jun. 12, 2007. This application claims the benefit of priority from the Japanese Patent Application, so that the descriptions of which are all incorporated herein by reference.

FIELD OF THE INVENTION

The present invention relates to controllers for controlling a robot body in which a power-off brake is installed; this power off brake works to brake a servomotor installed in the robot body and configured to drive at least one link of the robot body. In the specification, "servomotor" means a motor to be controlled and therefore various types of motors can be used as the "servomotor".

BACKGROUND OF THE INVENTION

Servomotors installed in various types of robots work to drive joints of a robot body, and, when the servomotors are off, no braking force acts on them. In an articulated robot, this may result that an arm vertically rotatable by a joint falls by gravity. In a SCARA (Selective Compliance Assembly Robot Arm) robot, this may result that an arm vertically rotatable by a joint moves downward by gravity.

Thus, in order to address the problem, power-off brakes are commonly installed in various types of robots. The power-off brakes are configured to brake at least one servomotor for driving at least one joint affected by gravity in its stopped state.

A power-off brake applies mechanical braking force to a servomotor with a brake-release power source being disconnected thereto, and stops the application of the mechanical braking force to the servomotor with the brake-release power source being connected thereto.

Specifically, during the servomotor being deenergized, the power-off brake is configured to be isolated from the brake-release power source. The servomotor can be turned on with the power-off brake being energized by the brake-release power source.

In order to address emergency situations required to move a robot body in such a state where a servomotor for moving the robot is stopped by mechanical braking force applied from a corresponding power-off brake, a manually operable brake-release on/off button switch is provided on the robot body. The brake-release on/off button switch, referred to simply as "brake-release switch", is connected between the brake-release power source and the power-off brake.

When switched on, the brake-release switch allows establishment of electrical connection between the brake-release power source and the power-off brake to thereby stop the application of the mechanical braking force to the servomotor.

FIG. 7 schematically illustrates an example of a circuit for controlling the power-off brake in response to on/off operation of the brake-release switch.

Off state of a switch 104 disconnects a brake-release power source 105 from a power-off brake 102 (see FIG. 7) so that the power-off brake 102 works to apply mechanical braking force to a servomotor (not shown) of a robot body 101.

When a brake-release switch 106 provided on the robot body 101 is switched on, electrical connection between the power-off brake 102 and the brake-release power source 105 is established. This prevents the power-off brake from applying the mechanical braking force to the servomotor, allowing the robot body 1 to move.

In articulated robots or the like, when a power-off brake is released, a vertically swingable arm may fall by gravity, or an arm may rise due to air unbalance. In this uncontrolled movement of a link, such as an arm, of the robot body, a dynamic brake of a servomotor associated with the uncontrolled movement of the robot body is activated so that braking force acts on the uncontrolled movement of the link of the robot body. This reduces high-speed movement of the part of the robot body.

However, when the power-off brake is released with the dynamic brake failing, a link of the robot body may start to move at a high speed simultaneously with the release of the power-off brake.

In order to address such a problem, Japanese Patent Application Publication No. H04-315593 discloses a mechanism configured to cause a ratchet to be engaged with an arm vertically movable by a joint of a robot body; this permits the vertically movable arm to only move upward to thereby prevent the vertically movable arm from moving downward.

However, the structure of the mechanism required to cause the ratchet to be engaged with the vertically movable arm of the robot body may increase complexity of the structure of the robot body.

SUMMARY OF THE INVENTION

In view of the background, an object of an aspect of the present invention is to provide controllers and program products for controlling a robot body in which a servomotor and a power-off brake therefor are installed; these controller and program products are capable of, when the power-off brake is released, reducing high-speed movement of the robot body without increasing complexity of the structure of the robot body.

According to one aspect of the present invention, there is provided a controller for controlling a robot body with a joint drivable by a servomotor installed in the robot body. The servomotor is mechanically braked by a power-off brake installed in the robot body when the servomotor is deenergized. The controller includes a first switch unit configured to establish electrical connection between the power-off brake and a power source therefor when the servomotor is energized. The established electrical connection between the power-off brake and the power source causes the power-off brake to be released. The controller includes a second switch unit manually operable and provided between the power-off brake and the power source. The second switch unit establishes electrical connection between the power-off brake and the power source upon being manually operated during the servomotor being deenergized. The controller includes a calculating unit configured to calculate a driving speed of the joint by the servomotor. The controller includes a determining unit configured to determine whether the calculated driving speed of the joint is greater than a predetermined threshold speed. The controller includes an interrupting unit configured to interrupt a supply of electrical power from the power source to the power-off brake through the electrical connection established by the second switch unit when it is determined that the calculated driving speed of the joint is greater than the predetermined threshold speed.

According to another aspect of the present invention, there is provided a controller for controlling a robot body with a joint drivable by a servomotor installed in the robot body. The servomotor is mechanically braked by a power-off brake installed in the robot body when the servomotor is deenergized. The controller includes a first switch unit configured to establish electrical connection between the power-off brake and a power source therefor when the servomotor is energized. The established electrical connection between the power-off brake and the power source causes the power-off brake to be released. The controller includes a second switch unit manually operable and provided between the power-off brake and the power source. The second switch unit establishes electrical connection between the power-off brake and the power source upon being manually operated during the servomotor being deenergized. The controller includes a failure determining unit configured to determine whether a dynamic brake of the servomotor is malfunctioned based on operation of the servomotor. The controller includes an interrupting unit configured to interrupt a supply of electrical power from the power source to the power-off brake through the electrical connection established by the second switch unit when it is determined that the dynamic brake of the servomotor is malfunctioned.

According to a further aspect of the present invention, there is provided a program product embedded in a media accessible by a computer of a controller for controlling a robot body with a joint drivable by a servomotor installed in the robot body. The servomotor is mechanically braked by a power-off brake installed in the robot body when the servomotor is deenergized. The controller includes a first switch unit configured to establish electrical connection between the power-off brake and a power source therefor when the servomotor is energized. The established electrical connection between the power-off brake and the power source causes the power-off brake to be released. The controller includes a second switch unit manually operable and provided between the power-off brake and the power source. The second switch unit establishes electrical connection between the power-off brake and the power source upon being manually operated during the servomotor being deenergized. The controller includes a switch element operatively connected to the computer and provided between the power source and the second switch unit. The switch element is configured to close so as to establish electrical connection between the power source and the second switch unit, and open so as to disconnect the power source and the second switch unit. The program product includes first means for instructing the computer to calculate a driving speed of the joint by the servomotor, and second means for instructing the computer to determine whether the calculated driving speed of the joint is greater than a predetermined threshold speed. The program product includes third means for instructing the computer to cause the switch element to open when it is determined that the calculated driving speed of the joint is greater than the predetermined threshold speed.

According to a still further aspect of the present invention, there is provided a program product embedded in a media accessible by a computer of a controller for controlling a robot body with a joint drivable by a servomotor installed in the robot body. The servomotor is mechanically braked by a power-off brake installed in the robot body when the servomotor is deenergized. The controller includes a first switch unit configured to establish electrical connection between the power-off brake and a power source therefor when the servomotor is energized. The established electrical connection between the power-off brake and the power source causes the power-off brake to be released. The controller includes a second switch unit manually operable and provided between the power-off brake and the power source. The second switch unit establishes electrical connection between the power-off brake and the power source upon being manually operated during the servomotor being deenergized. The controller includes a switch element operatively connected to the computer and provided between the power source and the second switch unit. The switch element is configured to close so as to establish electrical connection between the power source and the second switch unit, and open so as to disconnect the power source and the second switch unit. The program product includes first means for instructing the computer to determine whether a dynamic brake of the servomotor is malfunctioned based on operation of the servomotor. The program product includes second means operatively connected to the switch element for instructing the computer to cause the switch element to open when it is determined that the dynamic brake of the servomotor is malfunctioned.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with accompanying drawings.

First Embodiment

Figure 1:
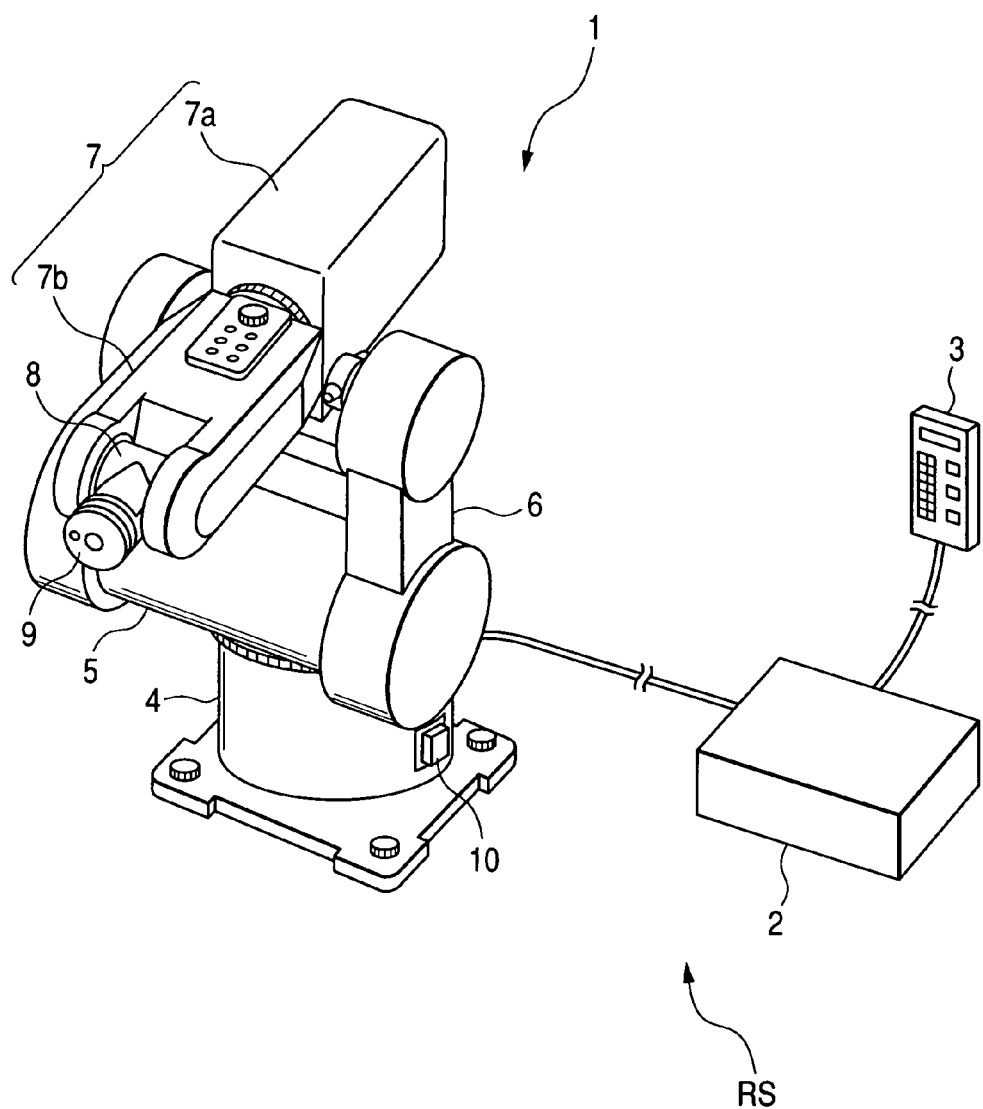
FIG. 1 is a perspective view schematically illustrating an example of the hardware configuration of a robot system according to a first embodiment of the present invention.
Figure 2:
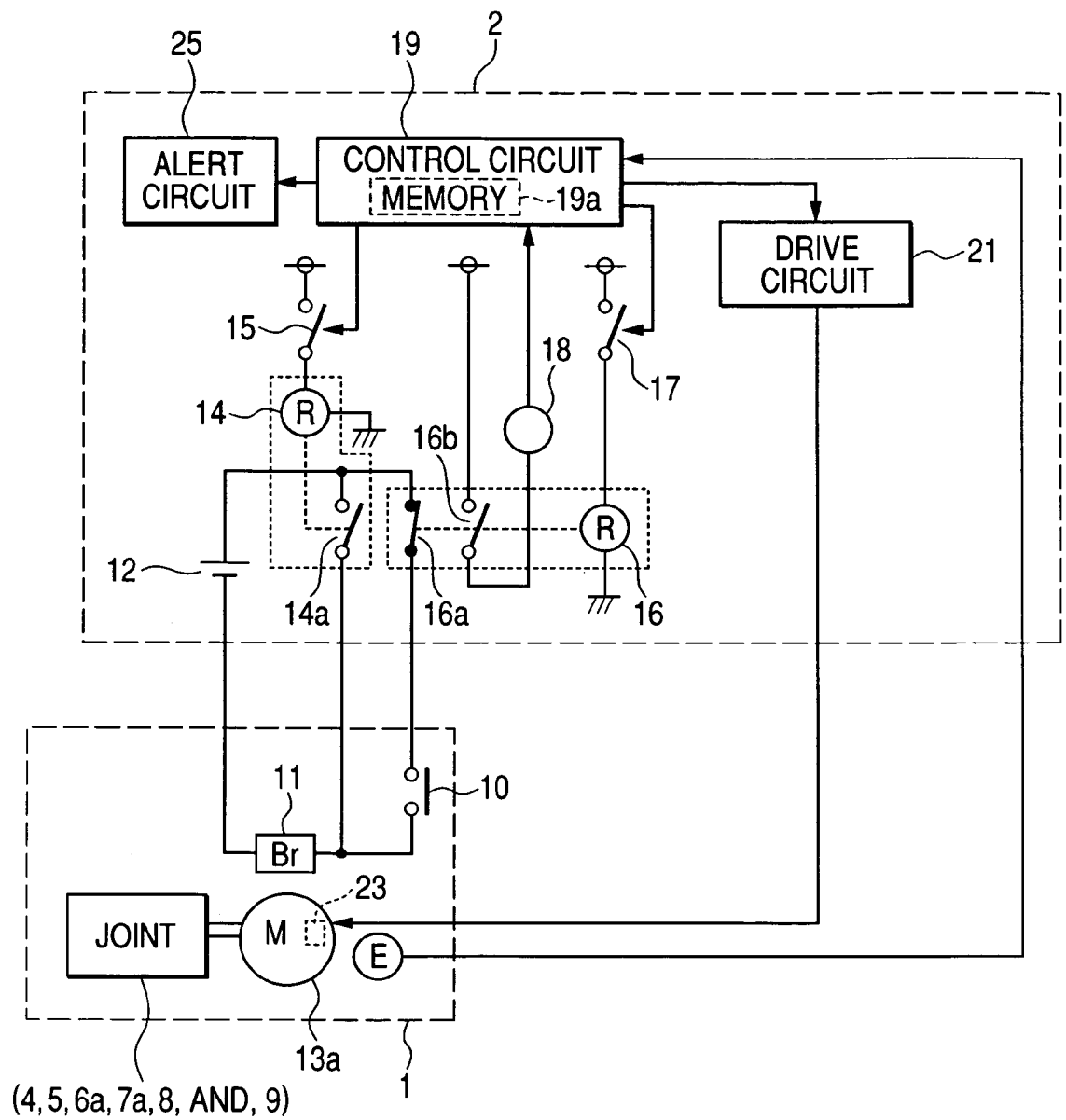
FIG. 2 is a circuit diagram schematically illustrating an example of the electrical system configuration of the robot system illustrated in FIG. 1.
Figure 3:
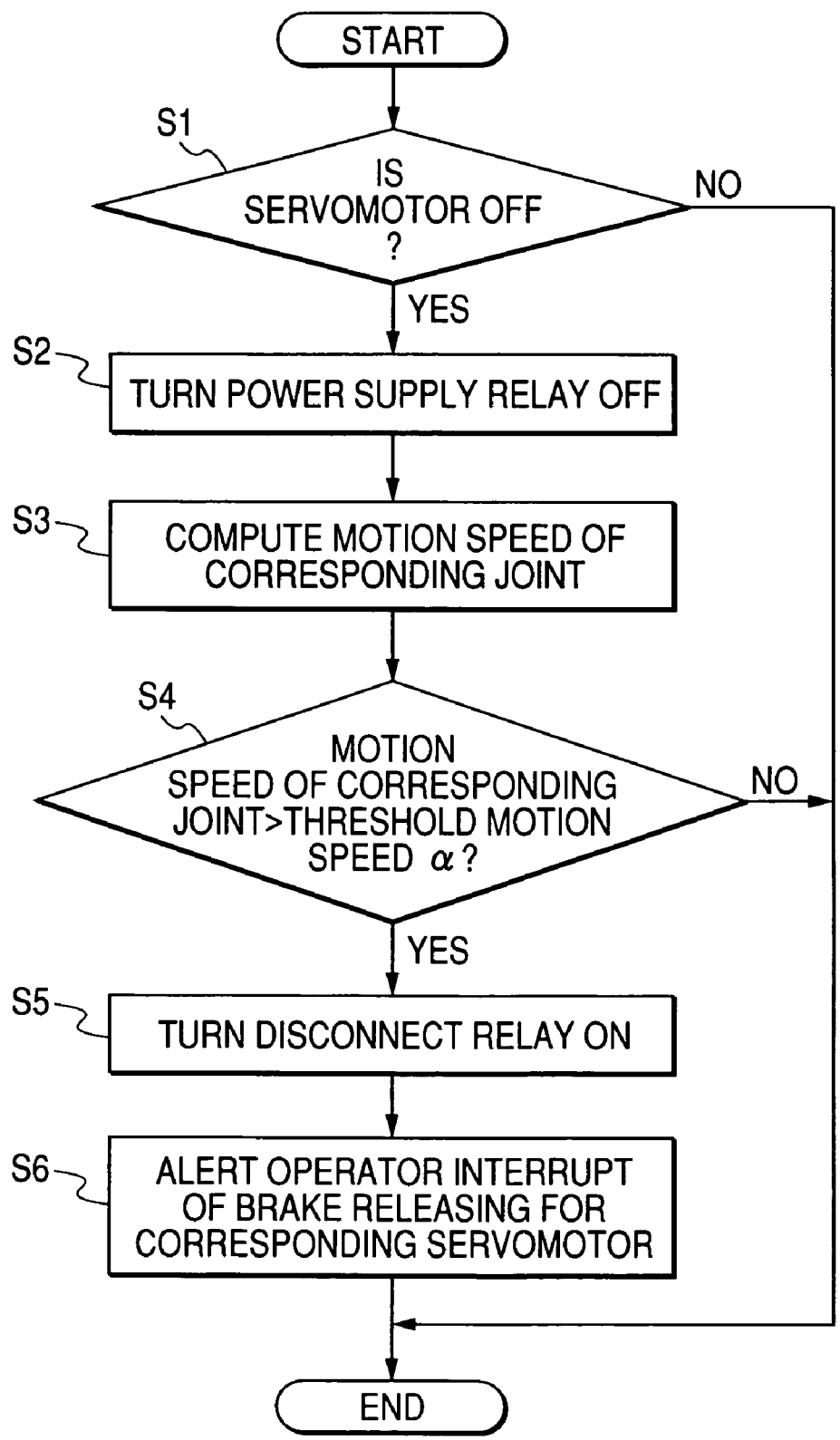
FIG. 3 is a flowchart schematically illustrating a stop control routine to be executed by the robot system according to the first embodiment.

Referring to FIGS. 1 to 3, there is illustrated an example of the overall structure of a robot system RS according to a first embodiment of the present invention.

The robot system RS is equipped with a robot body 1, a controller 2 electrically connected thereto via a cable and designed to control the robot body 1, and a teaching pendant 3 as a teaching box for the controller 2.

The robot body 1 is designed as, for example, an articulated robot body.

The robot body 1 consists of a substantially cylindrical base 4 mounted on a horizontal installation surface, such as a flooring of a factory. The robot body 1 consists of a substantially cylindrical shoulder joint 5 mounted on the base 4 such that the center axial direction of the shoulder joint 5 is orthogonal to the center axial direction of the base 4.

The shoulder joint 5 is configured to be horizontally rotatable on the base 4 about a center axis (motion axis) of the base 4. Specifically, the base 4 serves as a rotary joint to support the shoulder joint 5 and rotate it around the center axis thereof.

The robot body 1 consists of a pair of upper arms (upper arm joints) 6. One ends of the pair of upper arms 6 are pivotally supported by both ends of the shoulder joint 5 about the center axis (motion axis) thereof in the vertical direction corresponding to the center axial direction of the base 4. Specifically, the shoulder joint 5 is configured to support the upper arms 6 and rotate them around its center axis.

The robot body 1 consists of a substantially cylindrical arm joint 6a linked to the other ends of the pair of upper arms 6 to be vertically pivoted about its center axis (motion axis) in the vertical direction.

The robot body 1 consists of a substantially cuboid first lower arm 7a mounted as its one major side surface on an outer peripheral surface of the arm joint 6a to be pivotable together with the arm joint 6a about the center axis thereof in the vertical direction. Specifically, the arm joint 6a is configured to support the first lower arm 7a and pivot it around its center axis.

The robot body 1 consists of a second lower arm 7b extending from the first lower arm 7a and rotatably supported thereby about a center axis of the first lower arm 7a corresponding to a motion axis. Specifically, the first lower arm 7a serves as a joint to support the second lower arm 7b and rotate it around its center axis.

The tip end of the second lower arm 7b is forked. The first and second lower arms 7a and 7b constitute a lower arm link 7.

The robot body 1 consists of a substantially cylindrical wrist joint 8 inserted between the forked ends of the second lower arm 7b and pivotally supported thereby about its center axis (motion axis) in the vertical direction corresponding to the center axial direction of the base 4.

The wrist joint 8 is formed with a substantially cylindrical flange 9 projecting therefrom. The flange 9 has a tip end to be rotatable about its center axis (motion axis) corresponding to the projecting direction thereof. Specifically, the wrist joint 8 is configured to support the flange 9 and rotate it around its center axis.

The flange 9 is designed such that its tip end permits the mounting of a mechanical hand (mechanical gripper) formed at its one end with a grip portion that can grip various types of workpieces.

Specifically, the flange 9 (its tip end thereof serves as a hand joint to rotate its one end around its center axis together with the mechanical gripper.

The robot body 1 includes a plurality of servomotors 13 as actuators, and, for example, two power-off brakes 11 for braking corresponding two of the servomotors 13 (see FIG. 2). Hereinafter, reference character 13a is assigned to the two of the servomotors 13 on or near which the power-off brakes 11 are arranged (see FIG. 2). The robot body 1 also includes a plurality of rotary encoders E each attached to, for example, the rotating shaft of a corresponding one of the servomotors 13 (see FIG. 2).

Specifically, the base joint 4 is integrated with a servomotor 13 and a rotation transmission system (not shown) that transfers rotation of the servomotor 13 to the shoulder joint 5 to horizontally rotate it.

The shoulder joint 5 is integrated with the servomotor 13a and a rotation transmission system (not shown) that transfers rotation of the servomotor 13a to the upper arms 6 to vertically pivot them together with each other.

One of the two power-off brakes 11 is integrated in the shoulder joint 5 and operative to brake the servomotor 13a integrated in the shoulder joint 5.

The arm joint 6a is integrated with the servomotor 13a and a rotation transmission system (not shown) that transfers rotation of the servomotor 13 to the first lower arm 7a to vertically pivot it.

The other of the two power-off brakes 11 is integrated in the arm joint 6a and operative to brake the servomotor 13a integrated in the arm joint 6a.

The first lower arm (arm joint) 7a is integrated with a servomotor 13 and a rotation transmission system (not shown) that transfers rotation of the servomotor 13 to the second lower arm 7b to rotate it about its center axis.

The wrist joint 8 is integrated with a servomotor 13 and a rotation transmission system (not shown) that transfers rotation of the servomotor 13 thereto to vertically pivot itself together with the flange 9.

The flange (hand joint) 9 is integrated with a servomotor 13 and a rotation transmission system (not shown) that transfers rotation of the servomotor to its tip end to rotate it together with the gripper about its center axis.

Specifically, the base joint 4, the shoulder joint 5, the upper arm joint 6a, the lower arm joint 7a, the wrist joint 8, and the hand joint 9 of the robot body 1 serve as joints (joint mechanisms) thereof connected to corresponding links of the robot body 1 and configured to provide it motion.

In addition, the robot body 1 is equipped with a brake-release on/off button switch 10 mounted on, for example, the peripheral side wall of the base 4 to be manually operable (pushable). The brake-release on/off button switch, referred to simply as "brake-release switch", 10 works to release each of the power-off brakes 11 when pressed by an operator.

As illustrated in FIG. 2, the controller 2 includes a brake-release power source 12, a power supply relay 14 with a normally open contact 14a, and a switch 15. The controller 2 also includes an interrupt relay (disconnect relay) 16 with a normally-close contact 16a and a normally-open contact 16b, a switch 17, and a contact checker 18.

In addition, the controller 2 includes a control circuit 19 with a memory 19a, and drive circuits 21. The drive circuits 21 are electrically connected to the control circuit 19.

The memory 19a has stored therein system programs that cause the control circuit 19 to control the system resources of the robot body 1. The memory 19a has stored therein a robot motion program and the like.

The control circuit 19 is designed to be electrically connected to the teaching pendant 3 via a cable.

Note that, in FIG. 2, the base joint 4, the shoulder joint 5, the upper arm joint 6a, the lower arm joint 7a, the wrist joint 8, and the hand joint 9 are collectively illustrated as a joint by one block. Reference numerals 4, 5, 6a, 7a, 8, and 9 are assigned to the block of joint. Similarly, the drive circuits 21 for the respective servomotors 13 are collectively illustrated as one block.

The control circuit 19 is operative to detect an actual position and an actual motion speed of each of the joints 4, 5, 6a, 7a, 8, and 9 driven by a corresponding servomotor 13. The actual motion speed of each of the joints 4, 5, 6a, 7a, 8, and 9

(the speed of a corresponding servomotor 13) will be referred to simply as "motion speed (driving speed)" of each of the joints 4, 5, 6*a*, 7*a*, 8, and 9 hereinafter.

Specifically, the rotary encoders E for the respective servomotors 13 are electrically connected to the control circuit 19.

Each of the rotary encoders E serves as a position sensor and a speed sensor. Specifically, the rotary encoder E is configured to output digital pulses that correspond to angular motion of the rotating shaft of each of the servomotors 13. In other words, the rotary encoder E is configured to output digital pulses that correspond to a shaft speed of each of the servomotors 13. The pulse signal consisting of the train of the digital pulses is given to the control circuit 19.

The control circuit 19 is operative to detect, based on the pulse signal sent from each of the rotary encoders E, the actual position of the rotating shaft of each of the servomotors 13, and therefore, the actual position of a link of the robot body 1 corresponding to each of the joints 4, 5, 6*a*, 7*a*, 8, and 9.

In addition, the control circuit 19 is operative to:

count the number of the pulses in the pulse signal input from each of the rotary encoders E per unit of time; and detect, based on the counted result, the actual speed of each of the servomotors E, in other words, the actual motion speed of each of the joints 4, 5, 6*a*, 7*a*, 8, and 9.

The control circuit 19 is operative to:

execute feedback control of motion of a link of the robot body 1 provided by each of the joints 4, 5, 6*a*, 7*a*, 8, and 9 in accordance with the robot motion program using:

the actual position of a link of the robot body 1 corresponding to each of the joints 4, 5, 6*a*, 7*a*, 8, and 9; and the actual motion speed of each of the joints 4, 5, 6*a*, 7*a*, 8, and 9.

Each of the drive circuit 21 is operative to supply, to a corresponding servomotor 13, a drive current under control of the control circuit 19 to rotatably drive the corresponding servomotor 13 corresponding to at least one of the joints 4, 5, 6*a*, 7*a*, 8, and 9, thereby controlling the pose of a link of the robot body 1 corresponding to the at least one of the joints 4, 5, 6*a*, 7*a*, 8, and 9.

Each of the servomotors 13 includes a dynamic brake circuit 23.

The dynamic brake circuit 23 of each of the servomotors 13 is designed to brake motion of a link of the robot body 1 corresponding to one of the joints 4, 5, 6*a*, 7*a*, 8, and 9 when the motion speed thereof detected by the corresponding encoder E exceeds a predetermined allowable speed previously stored in the dynamic brake circuit 23.

For example, the dynamic brake circuit 23 of the servomotor 13*a* for the upper arms 6 is designed to brake motion of the upper arms 6 corresponding to the joint 5 when the motion speed thereof detected by the corresponding encoder E exceeds the predetermined allowable speed previously stored in the dynamic brake circuit 23.

Specifically, when the motion speed of one of the joints 4, 5, 6*a*, 7*a*, 8, and 9 exceeds the predetermined allowable speed, the dynamic brake circuit 23 is operative to switch the direction of current to be supplied to the servomotor 13 corresponding to the one of the joints 4, 5, 6*a*, 7*a*, 8, and 9. This allows the servomotor 13 to become a generator to thereby generate reverse torque to be applied in the direction opposite to the servomotor rotating direction. The reverse torque allows motion of a link provided by the corresponding one of the joints 4, 5, 6*a*, 7*a*, 8, and 9 to be braked. Preferably, electrical power generated by each servomotor 13 serving as the generator can be delivered to a power supply unit (not shown) of the controller 2 to be charged therein.

As described above, the power-off brakes 11 are arranged on or near the corresponding servomotors 13*a* for rotating the upper arms 6 and the lower arm link 7.

For example, each of the power-off brakes 11 is designed to apply mechanical braking force by, for example, springs to the rotating shaft of a corresponding servomotor 13*a* when deenergized. When energized, each of the power-off brakes 11 is designed to release the application of the mechanical braking force to the rotating shaft of a corresponding servomotor 13*a*.

Specifically, a positive electrode of the brake-release power source 12 is electrically connected to the normally open contact 14*a* of the power supply relay 14, and the normally open contact 14*a* is electrically connected to each of the power-off brakes 11. A negative electrode of the brake-release power source 12 is electrically connected to each of the power-off brakes 11.

The power supply relay 14 is electrically connected to the power supply unit of the controller 2 via the switch 15. The switch 15 is electrically connected to the control circuit 19 such that it can be switched on or off under control of the control circuit 19.

Specifically, when the switch 15 is off under control of the control circuit 19, no operating voltage is supplied to the power supply relay 14 via the switch 15. This keeps the normally open contact 14*a* open so that no electrical power is applied to each of the power-off brakes 11. This results that each of the power-off brakes 11 works to apply the mechanical braking force to a corresponding one of the servomotors 13*a* to brake it.

When the switch 15 is switched on under control of the control circuit 19, an operating voltage is supplied to the power supply relay 14 via the switch 15. This closes the normally open contact 14*a* so that electrical power is applied to each of the power-off brakes 11, whereby each of the power-off brakes 11 releases the application of the mechanical braking force to a corresponding one of the servomotors 13*a* to thereby allow it to turn.

The brake-release switch 10 and the normally close contact 16*a* of the interrupt relay 16 are electrically connected to each other in series. One end of the series-connected brake-release switch 10 and the normally close contact 16*b* is electrically connected to the positive electrode of the brake-release power source 12, and the other end thereof is electrically connected to each of the power-off brakes 11 in parallel to the normally open contact 14*a* of the power supply relay 14.

The interrupt relay 16 is electrically connected to the power supply unit of the controller 2 via the switch 17. The switch 17 is electrically connected to the control circuit 19 such that it can be switched on or off under control of the control circuit 19.

Specifically, when the switch 17 is off under control of the control circuit 19, no operating voltage is supplied to the interrupt relay 16 via the switch 17. This keeps the normally close contact 16*a* close.

When the switch 17 is switched on under control of the control circuit 19, an operating voltage is supplied to the interrupt relay 16 via the switch 17. This opens the normally close contact 16*a*.

The normally open contact 16*b* of the interrupt relay 16 works to be opened when the interrupt relay 16 is energized, and to be closed when deenergized. Specifically, the normally open contact 16*b* is configured to operate complementary to the normally close contact 16*a*.

In addition, one end of the normally open contact 16*b* of the interrupt relay 16 is electrically connected to the power supply unit of the controller 2, and the other end thereof is electrically connected to the contact checker 18. The contact checker 18 is electrically connected to the control circuit 19.

When energized by the power supply unit of the controller 2 during the normally open contact 16b being closed, the contact checker 18 works to check the operating state of the normally open contact 16b and send a result of the check to the control circuit 19. For example, when it is determined that the normally open contact 16b is continuously opened based on the checked result, the control circuit 19 determines that the normally close contact 16a is deposited.

Furthermore, the controller 2 includes an alert circuit 25 for visibly or auditorily alerting an operator in the event of an error in the robot system RS.

The teaching pendant 3 is designed to a handheld device composed of, for example, an input unit, a display unit, a memory unit, and a computing unit, which allow execution of basic functions, such as program start function, motion teaching function, machine lock functions, error message displaying functions, and the like. This handheld configuration of the teaching pendant 3 allows an operator to control the robot body 1 while observing the motion of the robot body 1.

In the first embodiment, information indicative of intended motions of the flange 9 or the mechanical hand (not shown) of the robot body 1 is given to the controller 2 beforehand by teaching tasks of the teaching pendant 3 in order to cause the robot body 1 to perform various desired tasks. The control circuit 19 of the controller 2 receives the information and stores it in the memory 19a.

Next, operations of the robot body 1 will be described hereinafter.

In non-operating state of the robot body 1, the switch 15 is off so that the servomotors 13a are braked by the mechanical braking force applied by the corresponding power-off brakes 11. This prevents the corresponding links (upper arms 6 and lower arm link 7) from falling by gravity.

In the non-operating state of the robot body 1, when an operator wants to cause the robot body 1 to perform a desired task, the operator operates the teaching pendant 3 to send, to the controller 2, an instruction to start the desired task.

When receiving the instruction, the control circuit 19 of the controller 2 switches the switch 15 on. This allows the operating voltage from the power supply unit of the controller 2 to be supplied to the power supply relay 14 so that the normally open contact 14a is closed. This results that electrical power is supplied from the brake-release power source 12 to each of the power-off brakes 11 to thereby release the mechanical braking force from each of the power-off brakes 11 to a corresponding one of the servomotors 13a. This allows the servomotors 13a to freely turn.

Thereafter, the control circuit 19 of the controller 2 drives at least one of the servomotors 13. This causes a corresponding at least one of the joints 4, 5, 6a, 7a, 8, and 9 to provide motion to a corresponding link of the robot body 1 in accordance with at least one of the system programs corresponding to the desired task.

After the desired task or during the motion of the robot body 1, when an operator wants to stop the motion of the robot body 1, the operator operates the teaching pendant 3 to send, to the controller 2, an instruction to stop the motion of the robot body 1.

When receiving the instruction, the control circuit 19 stops at least one of the servomotors 13 being driven to thereby stop a corresponding link of the robot body 1.

In the first embodiment, the control circuit 19 of the controller 2 repeatedly executes a stop control routine (program) for the servomotors 13a illustrated in FIG. 3 every predetermined time interval.

When launching the stop control routine, the control circuit 19 determines whether the servomotors 13a are off (deenergized) in step S1.

When it is determined that, for example, each servomotor 13a is off (the determination in step S1 is YES), the control circuit 19 turns the switch 15 off. This interrupts the application of the operating voltage from the power supply unit of the controller 2 to the power supply relay 14 to turn the power supply relay 14 off in step S2. This results that the normally open contact 14a is opened so that the electrical power supplied from the brake-release power source 12 to each of the power-off brakes 11 is interrupted.

This allows each of the power-off brakes 11 to apply the mechanical braking force to the rotating shaft of a corresponding one of the servomotors 13a to thereby mechanically stop the rotating shaft of each of the servomotors 13a. As a result, the upper arms 6 and the lower arm link 7 of the robot body 1 corresponding to the joints 5 and 6a (servomotors 13a) are mechanically held at their desired stop positions.

After turning-off of the power supply relay 14, the control circuit 19 computes an actual motion speed of each of the joints 5 and 6a (an actual speed of each of the servomotors 13a) based on the pulse signal sent from the rotary encoders E corresponding to the servomotors 13a in step S3.

In step S4, the control circuit 19 reads out a predetermined threshold motion speed $\alpha$ previously stored in the memory 19a, and compares the computed actual motion speed of each of the joints 5 and 6a with the threshold motion speed $\alpha$ to thereby determine whether the computed actual motion speed of each of the joints 5 and 6a is greater than the threshold motion speed $\alpha$. The threshold motion speed can be determined to be identical to the predetermined allowable speed or to be different therefrom.

When it is determined that the computed actual motion speed of each of the joints 5 and 6a is equal to or lower than the threshold motion speed $\alpha$ (the determination in step S4 is NO), the control circuit 19 terminates the stop control routine.

During the robot body 1 being stopped, when emergency situations occur so that the need to move, for example, each of the upper arms 6 and the lower arm link 7 arises, an operator pushes the brake-release switch 10 to switch it on. This allows establishment of electrical connection between the brake-release power source 12 and the power-off brakes 11 for the servomotors 13a corresponding to the upper arms 6 or the lower arm link 7 through the normally closed contact 16a. This releases the application of the mechanical braking force from each power-off brake 11 to a corresponding one of the servomotors 13a.

This allows the servomotor 13a corresponding to each of the upper arms 6 and the lower arm link 7 to turn, and therefore, it is possible to freely move each of the upper arms 6 and the lower arm link 7 subjected to gravity. This allows each of the upper arms 6 and the lower arm link 7 to move in order to address the emergency situations.

During the application of the mechanical braking force to the servomotors 13a being released, the upper arms 6 or the lower arm link 7 may fall by gravity or rise due to air unbalance.

In the first embodiment, even if the upper arms 6 or the lower arm link 7 falls by gravity or rises due to air unbalance, the dynamic brake circuit 23 corresponding to the upper arms 6 or the lower arm link 7 prevents it from moving at a speed higher than the predetermined allowable speed.

However, when an operator pushes the brake-release switch 10 to switch it on during the dynamic brake circuit 23 of one servomotor 13a corresponding to the upper arms 6 or the lower arm link 7 failing, the upper arms 6 or the lower arm link 7 would move at a high speed simultaneously with the release of the power-off brakes 11.

In the first embodiment in order to avoid the high-speed movement of the upper arms 6 or the lower arm link 7 during the dynamic brake circuit 23 of one servomotor 13a corresponding thereto failing, the control circuit 19 carries out the following operations of the stop control routine.

Specifically, when it is determined that the computed actual motion speed of the joint 5 or 6a is greater than the threshold motion speed α (the determination in step S4 is YES), the control circuit 19 determines that the upper arms 6 or the lower arm link 7 may moves at a high speed.

Then, in step S5, the control circuit 19 turns the switch 17 on to thereby turn the interrupt relay 16 on. This opens the normally closed contact 16a to thereby interrupt the application of the electrical power supplied from the brake-release power source 12 to each of the power-off brakes 11.

This allows each of the power-off brakes 11 to apply the mechanical braking force to the rotating shaft of a corresponding one of the servomotors 13a to thereby mechanically stop the rotating shaft of each of the servomotors 13a. As a result, the upper arms 6 and the lower arm link 7 of the robot body 1 are mechanically held at their desired stop positions.

After the operation in step S5, the control circuit 19 drives the alert circuit 25 so that it visibly and/or auditorily alerts an operator the interrupt of the brake releasing for the corresponding one of the servomotors 13a in step S6. Thereafter, the control circuit 19 exits the stop control routine.

Specifically, in the first embodiment, even if the upper arms 6 or the lower arm link 7 attempts to move at a high speed simultaneously with the release of the brake-release switch 10, the power-off brake 11 corresponding to the upper arms 6 or the lower arm link 7 stops the motion thereof. This prevents the upper arms 6 or the lower arm link 7 from inadvertently moving.

When the interrupt of the brake releasing is received by an operator, the operator determines that the dynamic brake circuit 23 of the corresponding one of the servomotors 13a is malfunctioned. This allows the operator to properly handle the malfunction of the dynamic brake circuit 23 corresponding one of the servomotors 13a by, for example, replacing it with a new one.

Note that, when the brake-release switch 10 is turned on, a comparatively large current flows through the normally close contact 16a of the interrupt relay 16. This may cause the normally close contact 16a to become deposited.

If the normally close contact 16a is deposited, energization of the interrupt relay 16 would not open the normally close contact 16a to whereby the application of the electrical power from the brake-release power source 12 to the power-off brakes 11 cannot be released.

However, in this case, because the normally open contact 16b has been abnormally kept open for a predetermined period of time, based on the check result of the operating state of the normally open contact 16b, the contact checker 18 determines that the normally close contact 16a is deposited. At that time of the determination, the contact checker 18 sends, to the control circuit 19, information indicative of the abnormality of the normally close contact 16a.

When receiving the information indicative of the abnormality of the normally close contact 16a, the alert circuit 25 visibly and/or auditorily alerts an operator the abnormality of the normally close contact 16a under control of the control circuit 19.

This allows the operator to actually check whether the normally close contact 16a is deposited, and replaces the interrupt relay 16 with a new one when it is determined that the normally close contact 16a is deposited.

As described above, the control circuit 19 according to the first embodiment is configured to:

compute the actual motion speed of each of the joints 5 and 6a corresponding to one of the servomotors 13a based on the pulse signal sent from the rotary encoder E corresponding to one of the servomotors 13a; and turn the interrupt relay 16 on to thereby interrupt electrical connection between the brake-release power source 12 and each of the power-off brakes 11 when it is determined that the computed actual motion speed of each of the joints 5 and 6a is greater than the threshold motion speed α.

This allows each of the power-off brakes 11 to apply the mechanical braking force to the rotating shaft of a corresponding one of the servomotors 13a to thereby mechanically stop the rotating shaft of each of the servomotors 13a. As a result, the upper arms 6 and the lower arm link 7 of the robot body 1 are mechanically held at their desired stop positions even if the dynamic brake circuits 23 of the corresponding servomotors 13a are malfunctioned.

Specifically, in the first embodiment, even if the dynamic brake circuit 23 of at least one of the servomotors 13a is abnormally operated, it is possible to prevent a corresponding link of the robot body 1 from moving at a high speed without using a complicated mechanism required to cause a ratchet to be engaged with the corresponding link.

To sum up, even if the dynamic brake circuit 23 of at least one of the servomotors 13a fails, the robot system RS according to the first embodiment prevents the corresponding at least one of the links of the robot body 1 from moving at a high speed with the structure of the robot body 1 being simplified and compact.

In the first embodiment, in order to prevent at least one link of the robot body 1 from moving at a high speed, the interrupt relay 16 is additionally provided such that its normally close contact 16a is connected to the brake-release switch 10 in series. The interrupt relay 16 is configured to be driven on or off based on the motion speed of a joint corresponding to the at least one link.

Accordingly, as compared with using a complicated mechanism required to cause a ratchet to be engaged with the at least one link of the robot body 1, it is possible to simply construct the robot body 1 without increasing the construction cost thereof.

Second Embodiment

A robot system according to a second embodiment of the present invention will be described hereinafter. The robot system of the second embodiment has substantially the same structure as that of the robot system RS of the first embodiment except for some differences described hereinafter. For this reason, like reference characters are assigned to like parts in the robot systems according to the first and second embodiments so that descriptions of the parts of the robot system of the second embodiment will be omitted or simplified.

Figure 4:
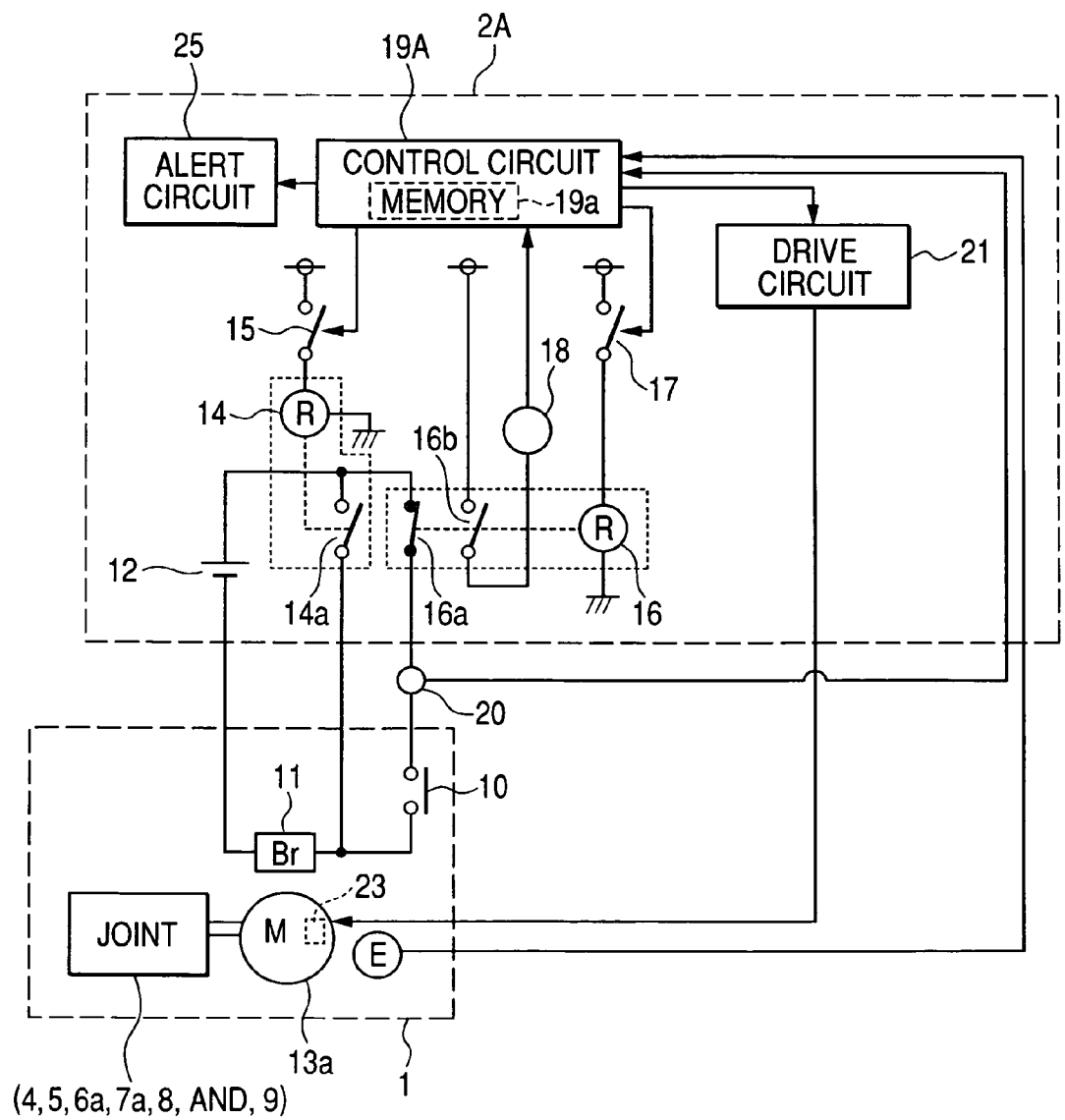
FIG. 4 is a circuit diagram schematically illustrating an example of the electrical system configuration of a robot system according to a second embodiment of the present invention.

Referring to FIG. 4, a controller 2A of the robot system according to the second embodiment is further provided with a current sensor 20 as an example of a detector for detecting an on operation of the brake-release switch 10.

In the first embodiment, the control circuit 19 is configured to compute an actual motion speed of each of the joints 5 and 6a (an actual speed of each of the servomotors 13a) based on the pulse signal sent from the rotary encoders E corresponding to the servomotors 13a independently of the operating state of the brake-release switch 10.

However, in the second embodiment, a control circuit 19A is programmed to compute an actual motion speed of each of the joints 5 and 6a based on the pulse signal sent from the rotary encoders E corresponding to the servomotors 13a in response to turning on of the brake-release switch 10.

Specifically, the current sensor 20 is provided between the normally close contact 16a and the brake-release switch 10 in series, and is electrically connected to the control circuit 19A. The current sensor 20 serves as a switch. That is, the current sensor 20 is turned on when a current flow therethrough, and is off while no current flows therethrough.

Figure 5:
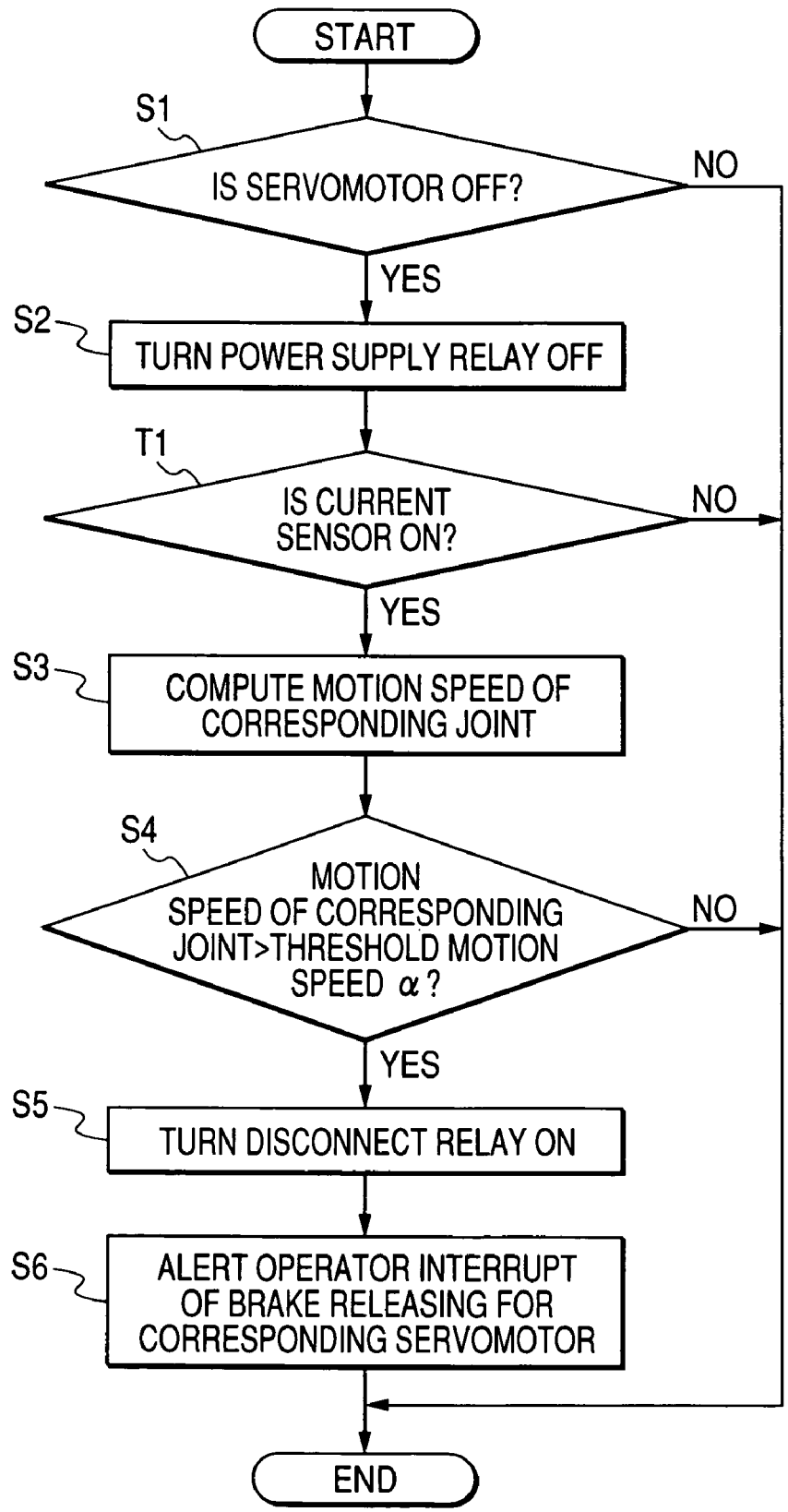
FIG. 5 is a flowchart schematically illustrating a stop control routine to be executed by the robot system according to the second embodiment.

Specifically, after turning-off of the power supply relay 14 in step S2, the control circuit 19A determines whether the current sensor 20 is in on state in step T1 of FIG. 5.

When the brake-release switch 10 is kept off, because no current flows from the brake-release power source 12 through the current sensor 20, the control circuit 1 determines that the current sensor 20 is in off state in step T1, terminating the stop control routine.

Otherwise, when an operator pushes the brake-release switch 10 so that it is switched on, because a current flows from the brake-release power source 12 through the current sensor 20, the control circuit 19A determines that the current sensor 20 is in on state in step T1, proceeding to step S3.

Then, the control circuit 19A computes an actual motion speed of each of the joints 5 and 6a based on the pulse signal sent from the rotary encoders E corresponding to the servomotors 13a in step S3.

In step S4, the control circuit 19A compares the computed actual motion speed of each of the joints 5 and 6a with the threshold motion speed α to thereby determine whether the computed actual motion speed of each of the joints 5 and 6a is greater than the threshold motion speed α.

When it is determined that the computed actual motion speed of each of the joints 5 and 6a is greater than the threshold motion speed α (the determination in step S4 is YES), the control circuit 19A determines that the upper arms 6 or the lower arm link 7 may moves at a high speed.

Then, in step S5, the control circuit 19A turns the switch 17 on to thereby turn the interrupt relay 16 on. This opens the normally closed contact 16a to thereby interrupt the application of the electrical power supplied from the brake-release power source 12 to each of the power-off brakes 11.

This allows each of the power-off brakes 11 to apply the mechanical braking force to the rotating shaft of a corresponding one of the servomotors 13a to thereby mechanically stop the rotating shaft of each of the servomotors 13a. As a result, the upper arms 6 and the lower arm link 7 of the robot body 1 are mechanically held at their desired stop positions.

After the operation in step S5, the control circuit 19A drives the alert circuit 25 so that it visibly and/or auditorily alerts an operator the interrupt of the brake releasing for the corresponding one of the servomotors 13a in step S6. Thereafter, the control circuit 19A exits the stop control routine.

As described above, the control circuit 19A according to the second embodiment is configured to energize each of the power-off brakes 11 only when it is determined that the break-release switch 10 is in on state.

Thus, in addition to the effects obtained by the robot system RS according to the first embodiment, the robot system according to the second embodiment prevents the control circuit 19A from unnecessarily computing an actual motion speed of each of the joints 5 and 6a. The robot system according to the second embodiment also prevents the alert circuit 25 from visibly or auditorily alerting an operator the interrupt of the brake releasing for a corresponding one of the servomotors 13a.

Note that, as described above, a detector for detecting an on operation of the brake-release switch 10 can be provided in place of the current sensor 20.

The power-off brake 11 can be provided on or near at least one of the servomotors 13 for braking it.

In place of the interrupt relay 16 connecting between the brake-release power source 12 and each power-off brake 11, a contactless relay circuit with, for example, a semiconductor switch for connecting therebetween can be used. As well as the interrupt relay 16, the contactless relay circuit is configured to disconnect the electrical connection between the brake-release power source 12 and each power-off brake 11 when the switch 17 is turned on.

In place of the interrupt relay 16 or the contactless relay circuit, an alternative circuit designed to interrupt a supply of electrical power from the brake-release power source 12 to each of the power-off brakes 11 can be used. For example, the alternating circuit can be designed to disable the brake-release power source 12.

The brake-release switch 10 can be provided in the controller 2 to be manually operable.

In the first and second embodiments and their modifications, the control circuit 19, 19A is programmed to determine that the dynamic brake circuit 23 of each of the servomotors 13a is malfunctioned when it is determined that the computed actual motion speed of each of the joints 5 and 6a is greater than the threshold motion speed α. The present invention is however not limited to the structure.

Figure 6A:
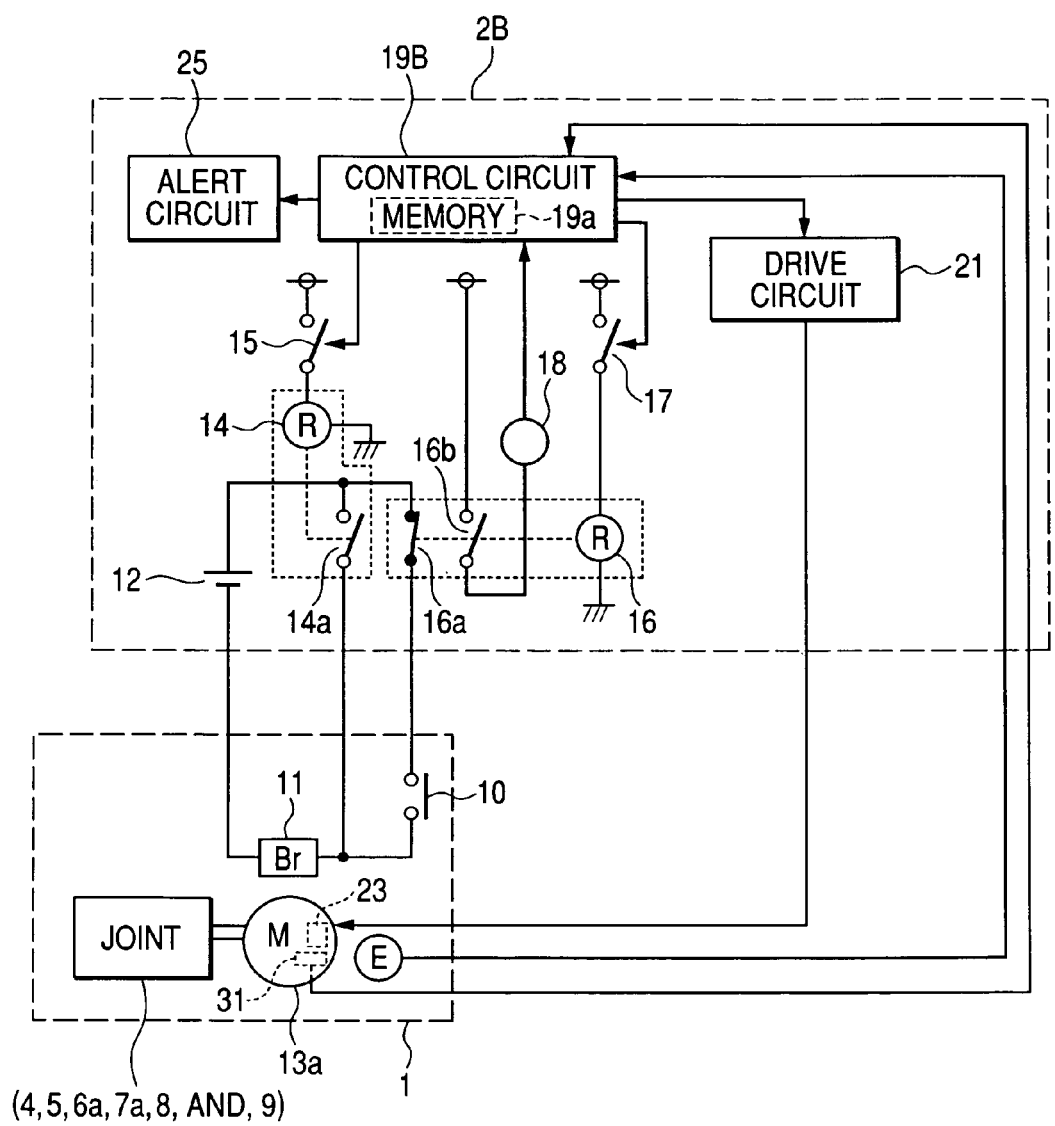
FIG. 6A is a circuit diagram schematically illustrating the electrical system configuration of a robot system according to a modification of the first embodiment.
Figure 6B:
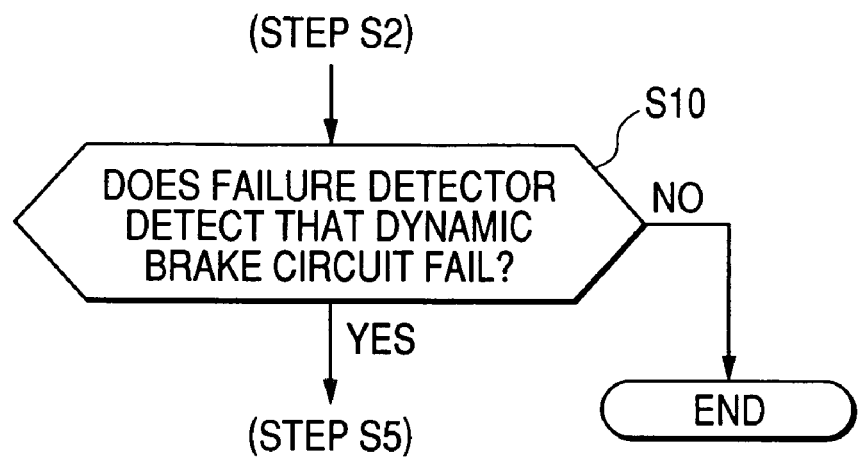
FIG. 6B is a flowchart schematically illustrating a part of a stop control routine to be executed by the robot system according to the modification of the first embodiment.
Figure 7:
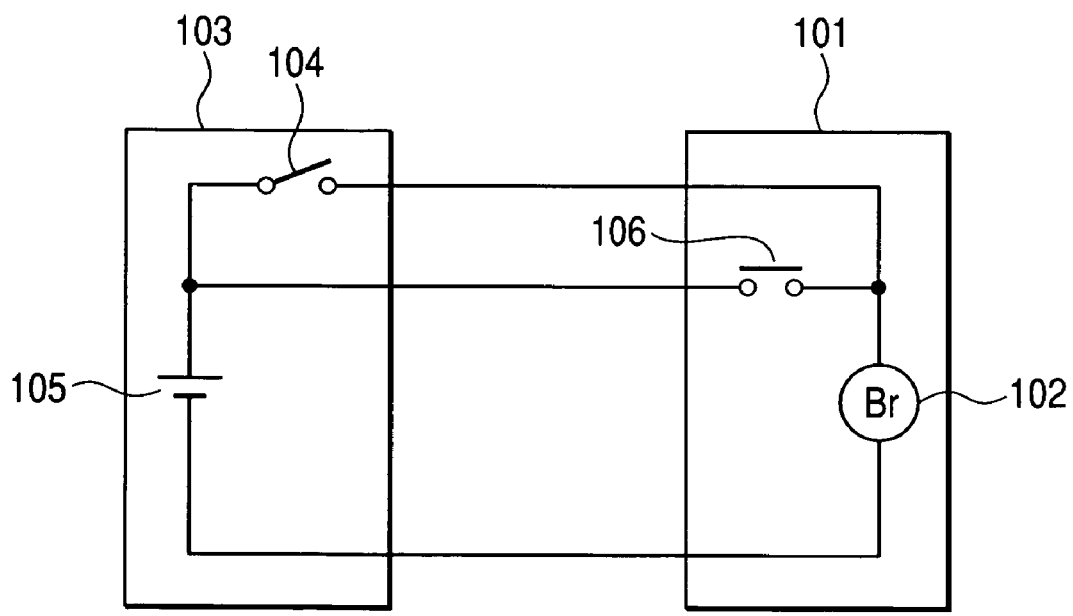
FIG. 7 is a circuit diagram schematically illustrating an example of a circuit for controlling a power-off brake in response to on/off operation of a brake-release switch.

Referring to FIG. 6A, a controller 2B of a robot system according to a modification of the first embodiment of the present invention is provided with a failure detector 31 installed in, for example, each of the servomotors 13. The failure detector 31 is electrically connected to a control circuit 19B of the controller 2B and configured to periodically monitor the operating state of the corresponding dynamic brake circuit 23 to thereby determine whether the corresponding dynamic brake circuit 23 is malfunctioned. The failure detector 31 is configured to periodically send, to the control circuit 19B, information indicative of the result of the determination.

Thus, the control circuit 19B, in place of the operations steps S3 and S4, receives the information currently sent from the failure detector 31 and determines whether the corresponding dynamic brake circuit 23 is malfunctioned based on the received information in step S10.

When it is determined that the corresponding dynamic brake circuit 23 is not malfunctioned (the determination in step S10 is NO), the control circuit 19B terminates the stop control routine.

Otherwise, when it is determined that the corresponding dynamic brake circuit 23 is malfunctioned (the determination in step S10 is YES), the control circuit 19B proceeds to the operations in steps S5 and S6 set forth above.

The robot system according to the modification of the first embodiment therefore achieves the same effects as the first embodiment.

In the first and second embodiments and their modifications, the present invention is applied to the articulated robot body 1, but can be applied to Cartesian Coordinate robot bodies or arm-robot bodies having a link movable by a joint corresponding to a servomotor.

In addition, those skilled in the art will appreciate that the present invention is capable of being distributed as software programs, for example, the system programs stored in the memory 19a in a variety of forms. It is also important to note that the present invention applies equally regardless of the particular type of signal bearing media used to actually carry out the distribution. Examples of suitable signal bearing media include recordable type media such as CD-ROMs and DVD-ROMs, and transmission type media such as digital and analog communications links.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A controller for controlling a robot body with a joint drivable by a servomotor installed in the robot body, the servomotor being mechanically braked by a power-off brake installed in the robot body when the servomotor is deenergized, the controller comprising:
   a first switch unit configured to establish electrical connection between the power-off brake and a power source therefor when the servomotor is energized, the established electrical connection between the power-off brake and the power source causing the power-off brake to be released;
   a second switch unit manually operable and provided between the power-off brake and the power source, the second switch unit establishing electrical connection between the power-off brake and the power source upon being manually operated during the servomotor being deenergized;
   a calculating unit configured to calculate a driving speed of the joint by the servomotor;
   a determining unit configured to determine whether the calculated driving speed of the joint is greater than a predetermined threshold speed; and
   an interrupting unit configured to interrupt a supply of an electrical power from the power source to the power-off brake through the electrical connection established by the second switch unit when it is determined that the calculated driving speed of the joint is greater than the predetermined threshold speed.

2. A controller according to claim 1, wherein the determining unit determines that a dynamic brake of the servomotor is malfunctioned when determining that the calculated driving speed of the joint is greater than the predetermined threshold speed.

3. A controller according to claim 1, wherein the interrupting unit comprises:
   a switch element provided between the power source and the second switch unit and configured to:
   close so as to establish electrical connection between the power source and the second switch unit; and
   open so as to disconnect the power source and the second switch unit; and
   a control unit configured to control the switch element so that the switch element opens when it is determined that the dynamic brake of the servomotor is malfunctioned.

4. A controller according to claim 3, wherein the switch element is a normally closed contact of a relay, and the control unit is configured to turn the relay on to thereby cause the normally closed contact to open when it is determined that the dynamic brake of the servomotor is malfunctioned.

5. A controller according to claim 4, wherein the relay comprises a normally open contact designed to operate complementary to the normally closed contact, further comprising:
   a deposit checker configured to check whether the normally closed contact is deposited based on operation of the normally open contact.

6. A controller according to claim 1, wherein the interrupting unit comprises a detector to detect that the second switch unit is activated, the interrupting unit being configured to interrupt the electrical connection between the power-off brake and the power source established by the second switch unit as long as the detector detects that the second switch unit is activated.

7. A controller for controlling a robot body with a joint drivable by a servomotor installed in the robot body, the servomotor being mechanically braked by a power-off brake installed in the robot body when the servomotor is deenergized, the controller comprising:
   a first switch unit configured to establish electrical connection between the power-off brake and a power source therefor when the servomotor is energized, the established electrical connection between the power-off brake and the power source causing the power-off brake to be released;
   a second switch unit manually operable and provided between the power-off brake and the power source, the second switch unit establishing electrical connection between the power-off brake and the power source upon being manually operated during the servomotor being deenergized;
   a failure determining unit configured to determine whether a dynamic brake of the servomotor is malfunctioned based on operation of the servomotor; and
   an interrupting unit configured to interrupt a supply of an electrical power from the power source to the power-off brake through the electrical connection established by the second switch unit when it is determined that the dynamic brake of the servomotor is malfunctioned.

8. A controller according to claim 7, wherein the failure determining unit comprises:
   a calculating unit configured to calculate a driving speed of the joint by the servomotor; and
   a determining unit configured to:
   determine whether the calculated driving speed of the joint is greater than a predetermined threshold speed; and
   determine that the dynamic brake of the servomotor is malfunctioned when it is determined that calculated driving speed of the joint is greater than the threshold speed.

9. A program product embedded in a non-transitory media accessible by a computer of a controller for controlling a robot body with a joint drivable by a servomotor installed in the robot body, the servomotor being mechanically braked by a power-off brake installed in the robot body when the servomotor is deenergized, the controller comprising:
   a first switch unit configured to establish electrical connection between the power-off brake and a power source therefor when the servomotor is energized, the established electrical connection between the power-off brake and the power source causing the power-off brake to be released;
   a second switch unit manually operable and provided between the power-off brake and the power source, the second switch unit establishing electrical connection between the power-off brake and the power source upon being manually operated during the servomotor being deenergized; and
   a switch element operatively connected to the computer and provided between the power source and the second switch unit, the switch element being configured to:
   close so as to establish electrical connection between the power source and the second switch unit; and open so as to disconnect the power source and the second switch unit, the program product comprising:

first means for instructing the computer to calculate a driving speed of the joint by the servomotor;

second means for instructing the computer to determine whether the calculated driving speed of the joint is greater than a predetermined threshold speed; and third means for instructing the computer to cause the switch element to open when it is determined that the calculated driving speed of the joint is greater than the predetermined threshold speed.

10. A program product embedded in a non-transitory media accessible by a computer of a controller for controlling a robot body with a joint drivable by a servomotor installed in the robot body, the servomotor being mechanically braked by a power-off brake installed in the robot body when the servomotor is deenergized, the controller comprising:

a first switch unit configured to establish electrical connection between the power-off brake and a power source therefor when the servomotor is energized, the established electrical connection between the power-off brake and the power source causing the power-off brake to be released;

a second switch unit manually operable and provided between the power-off brake and the power source, the second switch unit establishing electrical connection between the power-off brake and the power source upon being manually operated during the servomotor being deenergized; and a switch element operatively connected to the computer and provided between the power source and the second switch unit, the switch element being configured to:

close so as to establish electrical connection between the power source and the second switch unit; and open so as to disconnect the power source and the second switch unit, the program product comprising:

first means for instructing the computer to determine whether a dynamic brake of the servomotor is malfunctioned based on operation of the servomotor; and second means for instructing the computer to cause the switch element to open when it is determined that the dynamic brake of the servomotor is malfunctioned.

* * * * *